(12) United States Patent
Boegel

(10) Patent No.: US 10,115,314 B2
(45) Date of Patent: Oct. 30, 2018

(54) LANE CHANGE SYSTEM FOR PLATOON OF VEHICLES

(71) Applicant: MAGNA ELECTRONICS INC., Auburn Hills, MI (US)

(72) Inventor: Ruediger K. Boegel, Grossostheim (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 133 days.

(21) Appl. No.: 15/203,840

(22) Filed: Jul. 7, 2016

(65) Prior Publication Data

US 2017/0011633 A1    Jan. 12, 2017

Related U.S. Application Data

(60) Provisional application No. 62/189,962, filed on Jul. 8, 2015.

(51) Int. Cl.
*G06F 19/00* (2018.01)
*G06G 7/70* (2006.01)
(Continued)

(52) U.S. Cl.
CPC .......... *G08G 1/22* (2013.01); *B60W 30/18163* (2013.01); *G05D 1/0293* (2013.01);
(Continued)

(58) Field of Classification Search
CPC ..................... B60W 30/18163; G05D 1/0293
(Continued)

(56) References Cited

U.S. PATENT DOCUMENTS 6,690,268 B2    2/2004  Schofield et al.
6,693,517 B2    2/2004  McCarthy et al.
(Continued)

FOREIGN PATENT DOCUMENTS

DE    10109046 A1 *  9/2002
DE    10109046 A1    9/2002

OTHER PUBLICATIONS

Alam, Assad, Fuel-Efficient Distributed Control for Heavy Duty Vehicle Platooning, KTH Electrical Engineering, Licentiate Thesis in Automatic Control, Stockholm, Sweden 2011.
(Continued)

*Primary Examiner* — Maceeh Anwari
(74) *Attorney, Agent, or Firm* — Honigman Miller Schwartz and Cohn, LLP

(57) ABSTRACT

A platoon control system includes a platoon control in communication with a plurality of individual platoon vehicle controls associated with respective platoon vehicles of a platoon of vehicles traveling along an initial traffic lane. The platoon control determines if there is sufficient clearance in another lane for the platoon of vehicles. Responsive to the platoon control, the individual platoon vehicle controls control the respective platoon vehicles to maneuver the platoon vehicles from the initial traffic lane to the other lane in a manner that limits or substantially precludes other vehicles from interrupting the platoon of vehicles. Responsive to the platoon control, the individual platoon vehicle controls control the respective platoon vehicles so that the last platoon vehicle of the platoon of vehicles enters the other lane first and then the other platoon vehicles enter the other lane ahead of the last vehicle in a predetermined controlled manner.

20 Claims, 36 Drawing Sheets

(51) Int. Cl.
- *G06G 7/76* (2006.01)
- *G08G 1/00* (2006.01)
- *B60W 30/18* (2012.01)
- *G05D 1/02* (2006.01)

(52) U.S. Cl.
CPC ..... *B60W 2550/10* (2013.01); *B60W 2550/30* (2013.01); *B60W 2900/00* (2013.01)

(58) Field of Classification Search
USPC .......................................................... 701/117
See application file for complete search history.

(56) References Cited

U.S. PATENT DOCUMENTS

| | | | |
|---|---|---|---|
| 7,580,795 | B2 | 8/2009 | McCarthy et al. |
| 2012/0062743 | A1 | 3/2012 | Lynam et al. |
| 2012/0218412 | A1 | 8/2012 | Dellantoni et al. |
| 2013/0222592 | A1 | 8/2013 | Gieseke |
| 2014/0218529 | A1 | 8/2014 | Mahmoud et al. |
| 2014/0375476 | A1 | 12/2014 | Johnson et al. |
| 2015/0124096 | A1 | 5/2015 | Koravadi |
| 2015/0158499 | A1 | 6/2015 | Koravadi |
| 2015/0251599 | A1 | 9/2015 | Koravadi |
| 2015/0344028 | A1 | 12/2015 | Gieseke et al. |
| 2015/0352953 | A1 | 12/2015 | Koravadi |
| 2016/0036917 | A1 | 2/2016 | Koravadi et al. |
| 2016/0210853 | A1 | 7/2016 | Koravadi |
| 2017/0274906 | A1 | 9/2017 | Hassan et al. |

OTHER PUBLICATIONS

Awal, et al., "Optimal Traffic Merging Strategy for Communication-and-Sensor-Enabled Vehicles," Proceedings of the 16th International IEEE Annual Conference on Intelligent Transportation Systems (ITSC 2013), The Hague, The Netherlands, Oct. 6-9, 2013.

Dolginova, et al., "Safety Verification for Automated Platoon Maneuvers: A Case Study," MIT Laboratory for Computer Science, Cambridge, MA 02139, USA.

Frankel et al., "Robust Platoon Maneuvers for AVHS," California Path Technical Note, California Partners for Advanced Transit and Highways, Institute of Transportation Studies, University of California, Berkeley, Nov. 10, 1994.

Hendrick et al., "Transitional Platoon Maneuvers in an Automated Highway System," California Path Program, Institute of Transportation Studies, University of California, Berkeley, Dec. 1992.

Hobert, L.H. X, "A Study on Platoon Formations and Reliable Communication in Vehicle Platoons," Toyota InfoTechnology Center Co., Ltd, University of Twente, Tokyo, Japan, Jan. 20, 2012.

Michaud, et al., "Coordinated Maneuvering of Automated Vehicles in Platoons," T-ITS-05-10-0114, AUTO21 Network of centers of Excellence, Canada Research Chair and the Canadian Foundation for Innovation, Oct. 15, 2005.

Pueboobpaphan et al., "The Impacts of a Communication based Merging Assistant on Traffic Flows of Manual and Equipped Vehicles at an On-Ramp Using Traffic Flow Simulation," 2010 13th International IEEE, Annual Conference on Intelligent Transportation Systems, Madeira Island, Portugal, Sep. 19-22, 2010.

\* cited by examiner

LANE CHANGE SYSTEM FOR PLATOON OF VEHICLES

CROSS REFERENCE TO RELATED APPLICATION

The present application claims the filing benefits of U.S. provisional application Ser. No. 62/189,962, filed Jul. 8, 2015, which is hereby incorporated herein by reference in its entirety.

FIELD OF THE INVENTION

The present invention relates generally to a vehicle control system and, more particularly, to a vehicle control system for a platoon of vehicles traveling together.

BACKGROUND OF THE INVENTION

Platooning of vehicles is known, such as by using vehicle-to-vehicle (V2V) communications. Cooperative maneuvering of the platooned vehicles is also known. Communication systems for vehicles may provide for communication between vehicles and/or between a vehicle and a remote server. Such car2car or V2V and car2X or V2X technology provides for communication between vehicles based on information provided by one or more vehicles and/or information provided by a remote server or the like. Examples of such systems are described in U.S. Pat. No. 7,580,795 and/or U.S. Publication Nos. US-2012-0218412 and/or US-2012-0062743, which are hereby incorporated herein by reference in their entireties.

SUMMARY OF THE INVENTION

The present invention provides a vehicle control system that, such as responsive to a determination of a vehicle or obstacle in a lane ahead of a platoon of vehicles, controls the platoon vehicles of the platoon of vehicles to change the lane of all of the platoon vehicles to another lane in a manner that limits or substantially precludes other vehicles from interrupting the platoon of vehicles. The control system controls the platoon vehicles so that the last vehicle of the platoon enters the other lane first (when traffic clears) and then the vehicles of the platoon enter the other lane ahead of the last vehicle in a controlled manner. The control system includes a central or platoon control that determines the lane change parameters (such as responsive to sensors of the platoon vehicles or the like) and communicates control signals to individual vehicle controls of the respective platoon vehicles of the platoon of vehicles, whereby the individual vehicle controls cooperatively control the respective platoon vehicles to maneuver the platoon of vehicles into another traffic lane in a predetermined controlled manner.

Optionally, the control system may control the platoon vehicles so that the platoon vehicles enter the other lane in order from the last platoon vehicle in line (which is the first platoon vehicle to change lanes) to the first platoon vehicle in line. The vehicles may decelerate together to allow traffic in the other lane (ahead of the last platoon vehicle in line after that platoon vehicle has changed lanes) to pass the platoon vehicles.

Optionally, the control system may control the platoon vehicles so that the platoon vehicles enter the other lane in a different order than they were in the initial lane of travel. For example, the last platoon vehicle in line (which is the first platoon vehicle to change lanes) and one or more platoon vehicles immediately ahead of the last platoon vehicle may enter the other lane (when traffic allows it) and then the one or more platoon vehicles ahead of the last platoon vehicle increase their speeds relative to the last platoon vehicle in line (or the last platoon vehicle may decrease its speed) to make sufficient space between the platoon vehicles so that other platoon vehicles still in the initial lane may enter the other lane between adjacent spaced apart platoon vehicles. The vehicles may adjust their speeds in a coordinated manner to allow traffic in the other lane (ahead of the last platoon vehicle in line after that platoon vehicle has changed lanes) to pass the platoon vehicles and to align the platoon vehicles in the initial lane with respective gaps between the platoon vehicles that have moved into the other lane.

These and other objects, advantages, purposes and features of the present invention will become apparent upon review of the following specification in conjunction with the drawings.

DESCRIPTION OF THE PREFERRED EMBODIMENTS

The goal of an adaptive cruise control (ACC) automated platoon formation is to hold the platoon together, without having gaps or not participating vehicles enclosed within or between the platoon members. It is desired that the speed of all of the vehicles in the platoon or peloton convoy be kept relatively constant and the deceleration and acceleration actions be kept low and the distance (or time gap) between the platoon participating vehicles be kept minimal, so that the fuel consumption over all vehicles is kept at a reduced or minimal level.

It is also desired that just the driver of the leading vehicle needs to be attentive to traffic conditions while the other drivers of the platoon vehicles can stay inattentive to the traffic. Since naturally the platoon is moving between other traffic participants (such as, for example, a truck platoon on a highway moves in between cars and other not participating trucks) the platoon control has to respect the other vehicles and has to consider their potential driving behavior and maneuvers. Control wise these may be to be seen as disturbance variables, in worst case behaving randomly.

The probable case is that other traffic participants have an interest to drive smoothly and want to advance by themselves. Since at least some other vehicles may be driven manually by human, not always optimal, rational or more or less jumpy or spontaneous behavior, or reactions to traffic situations may be produced by the human drivers. Sometimes such actions are caused by being inattentive, unexperienced, demented, intoxicated or being handicapped in any way or just for fun. The weakness of advanced automated, semi-automated vehicle control or driving aid/assistance systems (ADAS) is that they typically lack or have too slow data processing and low conception since the sensors are less universally usable as the conception of an attentive, experienced human drivers. Particularly, the conception of the higher context of a traffic scene is difficult to grasp by sensor data conception algorithm of ADAS. Due to that, the usage of driving scene or traffic situation templates or patterns which lead to driving strategy templates, patterns or models possibly inspired by the driving behavior (or pattern) of reasonable, experienced human drivers, is more successful nowadays than having an algorithm which is freely drafting a driving strategy upon an emerging traffic situation.

Figure 1:
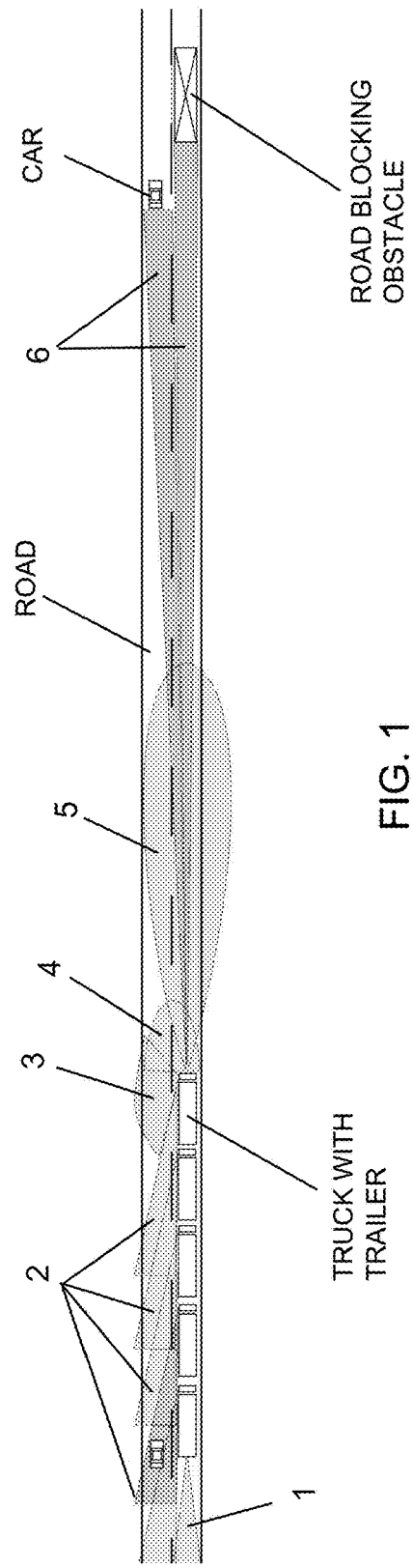
FIG. 1 is a plan view of a platoon of vehicles that are controlled via a control system in accordance with the present invention, showing that the lead vehicle may determine the presence of an obstacle ahead via a long range sensor of the lead vehicle.
Figure 2:
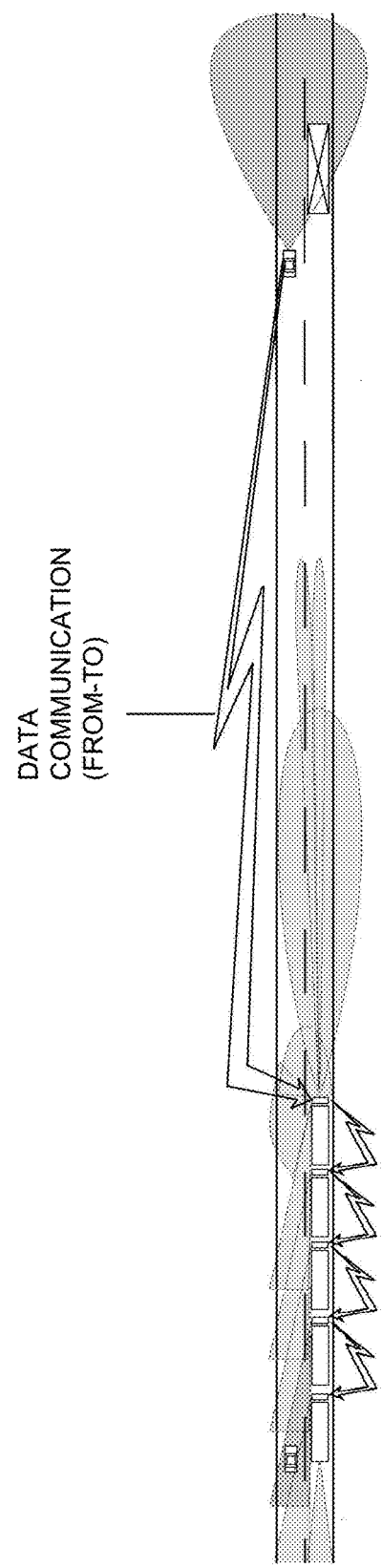
FIG. 2 is a plan view of a platoon of vehicles that are controlled via a control system in accordance with the present invention, showing that the lead vehicle may be alerted to the presence of an obstacle ahead via a communication from another vehicle.
Figure 3:
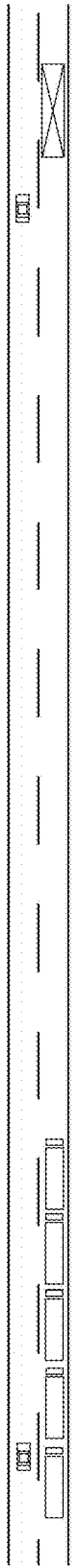
FIGS. 3-19 are plan views showing a control template of the platoon control system of the present invention.
Figure 4:
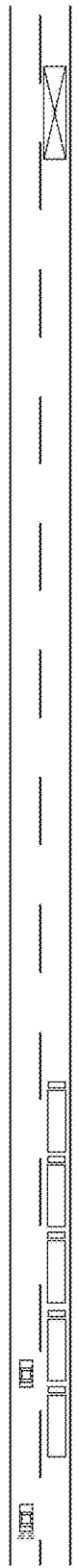
Figure 5:
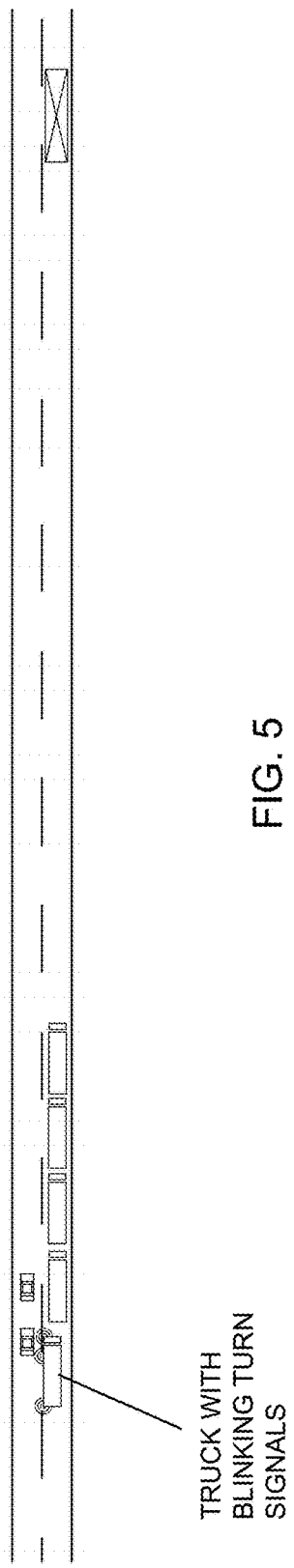
Figure 6:
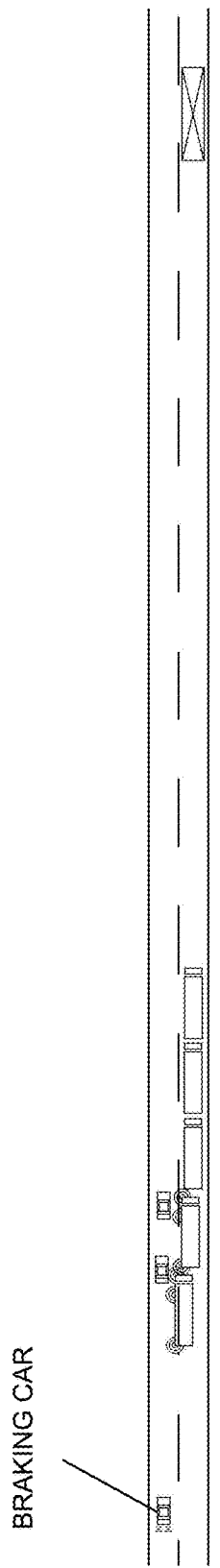
Figure 7:
Figure 8:
Figure 9:
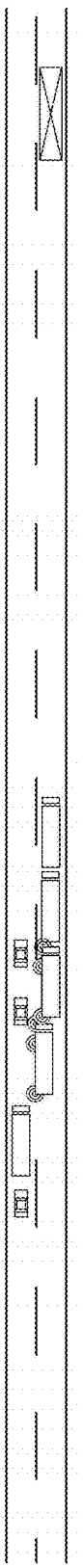
Figure 10:
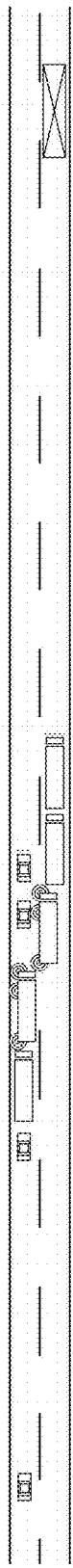
Figure 11:
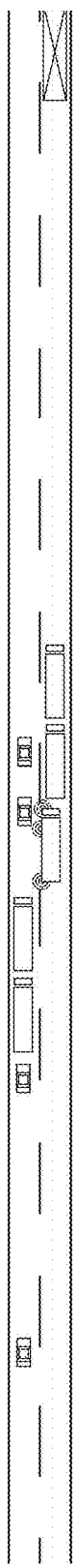
Figure 12:
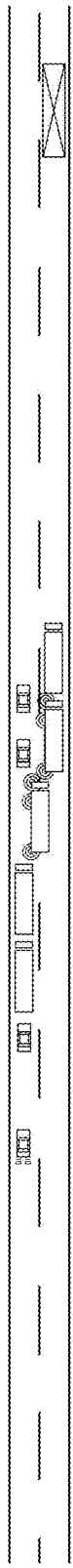
Figure 13:
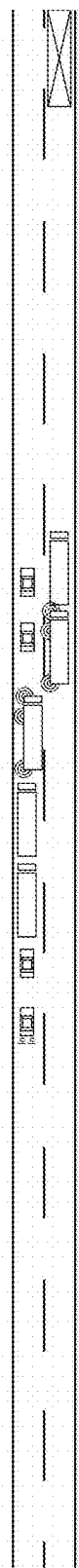
Figure 14:
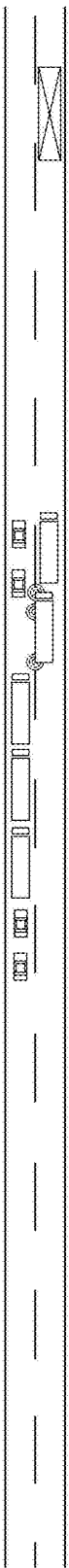
Figure 15:
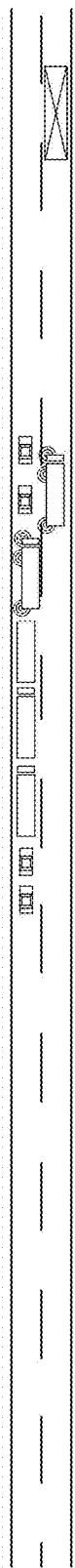
Figure 16:
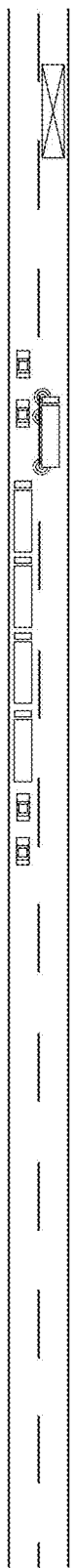
Figure 17:
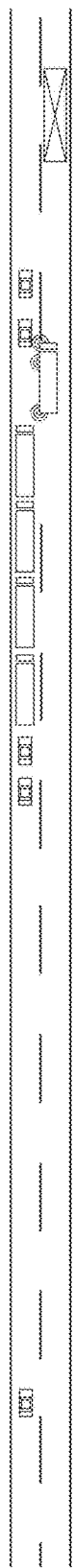
Figure 18:
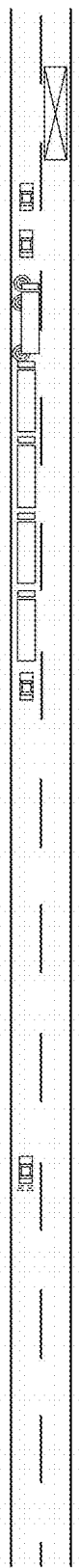

In accordance with the present invention, driving strategy templates of an (already connected) platoon of vehicles driving on a highway like scene are described below. The scenarios are based on the situations shown in FIGS. 1 and 2, where the platoon of vehicles (such as a line of five trucks) is driving along a highway in the right side traffic lane and is approaching an obstacle (such as a slowly traveling vehicle or other obstacle) in the right lane and thus in the eventual path of travel of the convoy. As shown in FIG. 1, the lead vehicle of the platoon may detect the object (such as via long range sensing, such as via a vision-based sensing system or radar sensing system or LIDAR sensing system or the like), whereby the vehicles in the platoon determine the presence of another vehicle or vehicles in the left side traffic lane at or near the platoon. Optionally, and such as shown in FIG. 2, the presence of the obstacle may be determined by a non-platoon vehicle (such as via a short range sensing system), whereby the detection of the obstacle is communicated to the lead platoon vehicle (such as via a V2V communication link or the like), and the information is also communicated to the other vehicles of the platoon, whereby the vehicles in the platoon determine the presence of another vehicle or vehicles in the left side lane at or near the platoon.

In an exemplary case shown in FIGS. 3 to 19 of the platoon driving strategy template, the platoon is moving at the right lane of a straight two lane (right hand traffic) highway approaching a steady, distant obstacle blocking the right lane (in general this will be a template for an ending lane, whatever the reason for that ending may be), while the left lane is clear beside some other traffic participants. The task is that the platoon changes into the left lane (fast traffic lane) to pass the blockage, without being cut-off or interrupted by enclosing foreign, non-platoon participating vehicles. It may be assumed that it is known that the distant object blocks the right lane at a known distance ahead, by the platoon control. That information may come from platoon vehicle inherent environmental sensors, such as visual cameras, infrared cameras, time of flight sensors, structured light sensors, RADAR, LIDAR, ultrasound sensors or any other kind of ranging sensor such as shown in the example of FIG. 1, having a long range with the sensor having the field of sensing 1 comprising a rearwardly directed (center) camera, the sensors having the fields of sensing 2 comprising rearwardly directed side mirror cameras, the sensor having the field of sensing 3 comprising a blind spot camera, the sensor having the field of sensing 4 comprising a cross traffic camera, the sensor having the field of sensing 5 comprising a forward vision driver assistance system camera and the sensor having the field of sensing 6 comprising a forwardly directed RADAR. Alternatively, that information may come from remote, such as from the obstacle itself (such as, for example, where the blocking object is a broken down vehicle with remote data transmission capability maintained such as by having an E-Call system in a car (such as by utilizing aspects of the systems described in U.S. patent application Ser. No. 62/312,127, filed Mar. 23, 2016, which is hereby incorporated herein by reference in its entirety) or the information may be transmitted by another vehicle (or more than one vehicle, optionally partitionally sent by different peers (such as by utilizing aspects of the systems described in U.S. Publication No. US-2015-0344028, which is hereby incorporated herein by reference in its entirety) or infra structure which detects the blockage by its own (inherent) sensors such as shown in FIG. 2.

For keeping non-participating vehicles off the platoon (and not getting between any two platoon vehicles), the last platoon vehicle (in the example of FIG. 3-19 all platoon vehicles are trailer trucks, optionally the platoon vehicle may be a mix of every kind of road vehicle) enters the left lane first as soon the traffic clearance allows it (which may be determined by a short range sensing system of the platoon vehicle, such as image-based sensors or ultrasonic sensors or RADAR or LIDAR sensors or the like). At that time the other platoon vehicles wait until the space for entering the left lane in front the first platoon vehicle (which is already in the fast traffic lane or other lane) is cleared from non-participating vehicles (waiting for the other vehicles to leave into headway direction), which possibly drive faster since these were in the fast traffic lane originally. As a result, the platoon can keep its speed steady and the drivers in the platoon do not need to interfere with the driving control of the platoon vehicles. Optionally, the leading platoon vehicle is driving autonomous or semi-autonomous with driver surveillance or fully controlled by the driver. In all cases the lane change for the leading platoon vehicle may be controlled automatically according to the suggested lane change pattern or the lane change of the leading vehicle may be just aided by visual, audible or haptic HMI so that the leading vehicle driver may be able to change the lane according the template maneuver as well.

Figure 19:
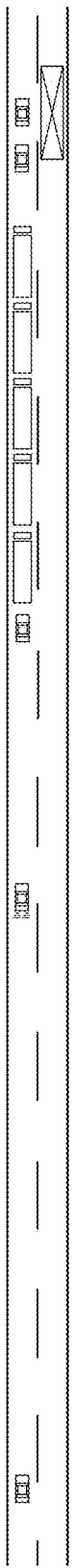
Figure 20:
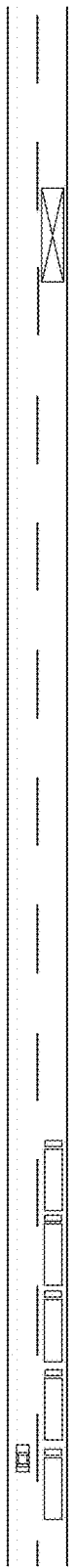
FIGS. 20-36 are plan views showing another control template of the platoon control system of the present invention.
Figure 21:
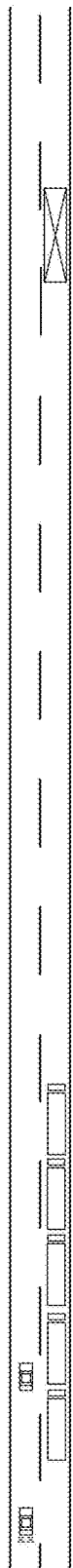
Figure 22:
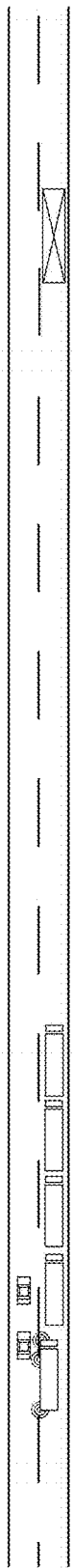
Figure 23:
Figure 24:
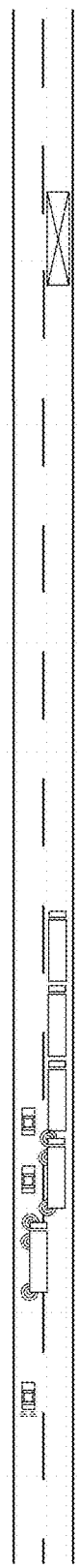
Figure 25:
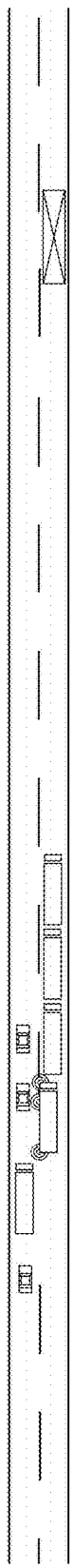
Figure 26:
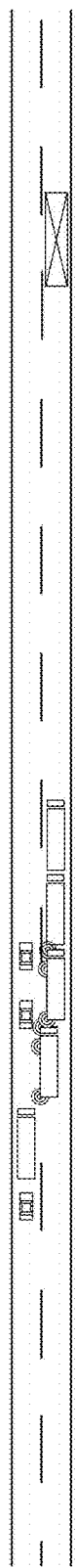
Figure 27:
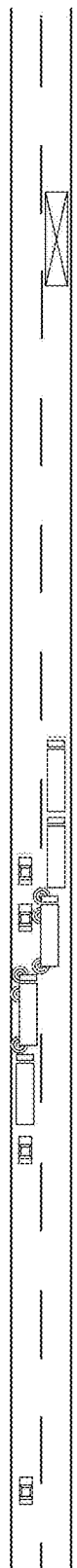
Figure 28:
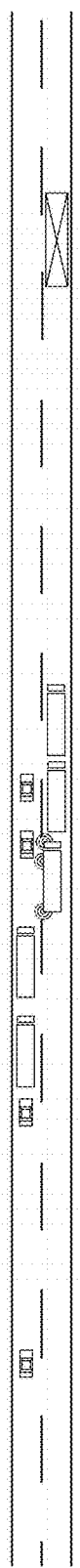
Figure 29:
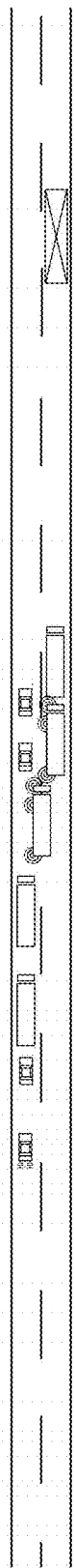

For example, when it is desired for the platoon of vehicles to change lanes (such as responsive to a determination of an obstacle or slower vehicle ahead of and in the current or initial traffic lane of travel of the platoon of vehicles, or such as when the platoon of vehicles has to change lanes to get into an exit lane or the like), the front vehicle senses ahead and to the side to determine if any object or vehicle is present in the other traffic lane or target lane, while the rear vehicle senses rearward and sideward to determine if there is a fast approaching vehicle in the other lane (or in the current or initial lane of travel), while the middle vehicle or vehicles sense sideward to determine if there are any other vehicles present in the other lane. When it is determined that the other lane is clear (at least clear in the region in which the platoon of vehicles will occupy), and if it is desired or appropriate for the platoon of vehicles to change lanes, the rear vehicle changes lanes first (FIGS. 5-7), followed by the next rearward-most vehicle (FIGS. 7-10), and then followed by the next rearward-most vehicle (FIGS. 9-13), and then followed by the next rearward-most vehicle (FIGS. 12-15), which is the second vehicle in line in the illustrated example, and finally followed by the leading vehicle (FIGS. 15-18), whereby all of the vehicles of the platoon of vehicles (such as five vehicles in the illustrated example, but there may be more or less vehicles in any given platoon of vehicles) are traveling in the other lane with no other vehicles in between the individual vehicles of the platoon of vehicles (FIG. 19).

For example, a four vehicle platoon (comprising a front vehicle, a rear vehicle and two middle vehicles between the front and rear vehicles) can be travelling along the middle traffic lane of a three-lane highway. Each of the platoon vehicles is equipped with a plurality of sensors. At the front of each platoon vehicle, at least one forward and sideward viewing vision-sensing camera captures image data of the exterior scene and at least one non-vision sensor (such as a radar or a Lidar sensor) senses and captures sensor data of the scene forward and sideward of the equipped platoon vehicle. At the rear of each platoon vehicle, at least one rearward and sideward viewing vision-sensing camera captures image data of the exterior scene and at least one non-vision sensor (such as a radar or a Lidar sensor) senses and captures sensor data of the scene rearward and sideward of the equipped platoon vehicle. Along both body sides of each platoon vehicle (such as along the side of a cab or trailer or the like of each platoon vehicle), at least one forward, rearward and sideward viewing vision-sensing camera captures image data of the exterior scene and at least one non-vision sensor (such as a radar or a Lidar sensor) senses and captures sensor data of the scene forward, rearward and sideward of the equipped platoon vehicle. Captured image data and sensor data from all such cameras and non-vision sensors is fed to a central electronic control module or platoon control (such as wirelessly fed or communicated between the platoon vehicles or located remotely via cloud-telematics communication or the like) where such received image data is processed by an image processor, such as an EyeQ3 or EyeQ4 or EyeQ5 image processing chip (and associated image processing algorithms) available from Mobileye N.V. of Jerusalem, Israel, and is combined/fused with received non-vision sensor data (such radar or Lidar-generated distance data or time-of-flight data) to determine that a lane change from the traffic lane currently being traveled by (or initially traveled by) the platoon of vehicles is safe and that other vehicles are not present in or soon to be present in the lane segment of an adjacent lane to which the platoon will move into. The central platoon control (which may be remotely located or may be disposed at one of the platoon vehicles) communicates control signals to the individual platoon vehicle controls of the respective individual platoon vehicles, whereby the individual platoon vehicle controls control the respective platoon vehicles to maneuver the platoon vehicles in the desired or appropriate or predetermined manner, such as to change traffic lanes to the other lane.

The individual platoon vehicles may be autonomously controlled or semi-autonomously controlled. It is envisioned that, for use with traffic lanes designated for autonomous vehicles only, platoons or convoys of vehicles will travel autonomously together, with the speeds synchronized or controlled to provide a desired gap between the platoon vehicles. The platoon control system may provide individual control of the platoon vehicle controls to maintain the desired or appropriate gap or spacing, and may adjust control of one or more of the platoon vehicles when a change is made to the platoon. For example, if one of the platoon vehicles exits the autonomous traffic lane, the platoon vehicle control or controls may adjust the speed of one or more of the platoon vehicles to close the gap caused by the exit of the one vehicle. Similarly, the platoon vehicle control or controls may adjust the speed of one or more of the platoon vehicles to create a gap to allow entry into the platoon of vehicles of another vehicle entering the autonomous traffic lane. The platoon control may determine the departure of a platoon vehicle via a communication from the departing vehicle or via sensors of one or more of the remaining platoon vehicles. Optionally, the departing vehicle may depart the autonomous traffic lane responsive to the current geographical location of the vehicle (such as responsive to a GPS system or the like) and/or to a navigation system or the like, whereby the departing vehicle leaves the autonomous traffic lane (whereby the driver resumes at least partial control of the vehicle) as it approaches an exit or intersection or the like where it will turn or otherwise leave the platoon path. After the departure of the departing vehicle, the platoon of vehicles autonomously regroups and continues on its way.

Figure 30:
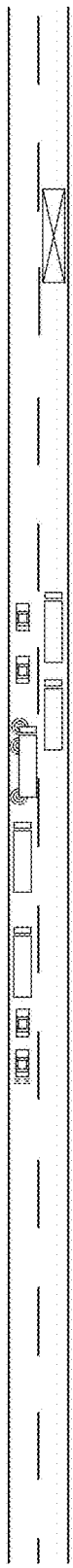
Figure 31:
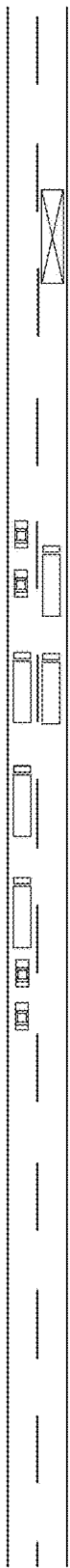
Figure 32:
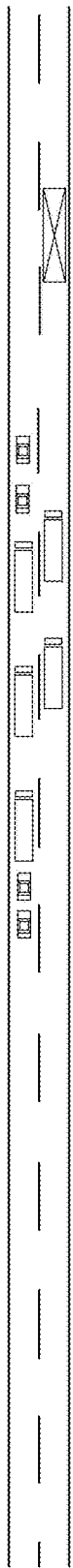
Figure 33:
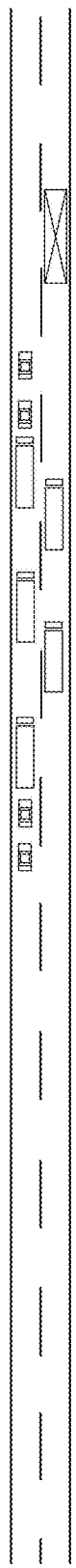

Since it is important that the non-platoon vehicles on the second or left or fast traffic lane do not overtake the other platoon vehicles in the first or right or slow traffic lane so that it will not be necessary for the platoon vehicles which are still traveling in the right lane to engage a full stop in front of a road obstacle that the platoon is closing at, another strategy to that described above (with respect to FIGS. 3-19) may be drawn, as shown in examples of FIGS. 20-36. In the illustrated example, at least two platoon vehicles enter the left lane (in the example of FIGS. 20-36, three of five platoon vehicles have entered the left lane by FIG. 30). These vehicles continuously increase their distance (the leading left lane platoon vehicle or vehicles increase their speed and/or the trailing vehicle or vehicles decrease their speed) to generate gaps large enough for the platoon vehicles remaining in the right lane to move into the gaps and thus into the left lane.

Figure 34:
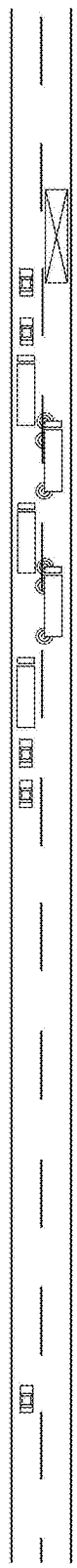
Figure 35:
Figure 36:

While the platoon vehicles traveling in the left lane are generating the gaps, the right lane platoon vehicles may control their speed in a way to position themselves in the heights of the gaps to be ready for entering when its gap has sufficiently opened (FIG. 34). Optionally, the gaps may be one at another (one big gap for more than one vehicle) or optionally may be one be alternating one (left lane) platoon vehicle, -gap, -platoon vehicle. The latter option will allow the right lane vehicles to enter in a zipper tooth like way such as shown in the example of FIGS. 34 to 36.

Thus, the lane change and merging control template, such as shown in FIGS. 20-36, makes sure that the full platoon can change into the left lane without getting cut off or interrupted by other vehicles and without the need that any of the platoon vehicles has to apply full braking in front of the lane blockage (or lane end).

The system in which the central or primary platoon control may be processed may be optionally the leading platoon vehicle or any other single platoon vehicle as a master vehicle. Optionally, the system may run on a cumulative group intelligence on several or all participating vehicles, organized to exchange storing or processing tasks and results in a kind of cumulative cloud.

The platoon control may be separate or may incorporate an environmental sensor processing and scene understanding (or determination, interpretation) system, optionally using a scene classification algorithm or the like, such as described in U.S. Publication No. US-2015-0344028, which is hereby incorporated herein by reference in its entirety.

The platoon vehicles include respective ACC systems and sensors that sense/determine the presence of other vehicles in the side lane adjacent to the traffic lane in which the platoon is initially traveling. The sensors may comprise cameras or RADAR or LIDAR or ultrasonic sensors or the like, whereby the ACC system (responsive to processing of sensor data) knows when it is safe to change lanes into the adjacent lane. The system, responsive to the sensors and to the central platoon control, may control the steering and acceleration/deceleration (such as via controlling the engine and/or brake system) to maneuver the respective platoon vehicle from an initial lane to another or target lane. The system may also actuate a turn signal indicator of the respective platoon vehicle to indicate to other vehicles on the road that the respective platoon vehicle is changing lanes.

The systems may communicate via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953 and/or US-2016-0036917, and; or U.S. patent application Ser. No. 14/996,570, filed Jan. 15, 2016, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454;

6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A platoon control system for controlling a plurality of vehicles traveling together as a platoon, said platoon control system comprising:
  a platoon control in communication with a plurality of individual platoon vehicle controls disposed at respective platoon vehicles of a platoon of vehicles;
  wherein each individual platoon vehicle control of said plurality of individual platoon vehicle controls is associated with a respective platoon vehicle of the platoon of vehicles traveling along an initial traffic lane, and wherein the platoon of vehicles comprises a lead platoon vehicle, a last platoon vehicle and at least one middle platoon vehicle between the lead platoon vehicle and the last platoon vehicle;
  wherein at least one sensor disposed at each platoon vehicle of the platoon of vehicles senses a region of another traffic lane immediately adjacent to the initial traffic lane to determine if another vehicle is present in the other traffic lane at or near the respective platoon vehicle;
  wherein, responsive to said at least one sensor disposed at each platoon vehicle of the platoon of vehicles, said platoon control determines if there is clearance in the other traffic lane for all of the platoon vehicles of the platoon of vehicles to maneuver into the other traffic lane;
  wherein, responsive to said platoon control determining that there is clearance in the other traffic lane for all of the platoon vehicles of the platoon of vehicles to maneuver into the other traffic lane, each said individual platoon vehicle control controls the respective platoon vehicle to maneuver the respective platoon vehicle from the initial traffic lane traveled by the platoon of vehicles to the other traffic lane in a manner that limits or precludes other vehicles from interrupting the platoon of vehicles as they maneuver into the other traffic lane; and
  wherein, responsive to said platoon control determining that there is clearance in the other traffic lane for all of the platoon vehicles of the platoon of vehicles to maneuver into the other traffic lane, each said individual platoon vehicle control controls the respective platoon vehicle so that the last platoon vehicle of the platoon of vehicles enters the other traffic lane first and then the other platoon vehicles enter the other traffic lane ahead of the last vehicle in a predetermined controlled manner.

2. The platoon control system of claim 1, wherein, responsive to said platoon control, each said individual platoon vehicle control controls the respective platoon vehicle so that the platoon vehicles enter the other traffic lane in order from the last platoon vehicle to the lead platoon vehicle.

3. The platoon control system of claim 2, wherein, responsive to said platoon control, each said individual platoon vehicle control controls the speed of the respective platoon vehicle to decelerate the platoon vehicles together to allow traffic in the other traffic lane that is ahead of the last platoon vehicle to pass the platoon of vehicles so there is clearance for all of the platoon vehicles of the platoon of vehicles to maneuver into the other traffic lane.

4. The platoon control system of claim 1, wherein, responsive to said platoon control, each said individual platoon vehicle control controls the respective platoon vehicle so that the platoon vehicles enter the other traffic lane in a different order than they were in the initial traffic lane.

5. The platoon control system of claim 4, wherein the at least one middle platoon vehicle comprises (i) a first middle platoon vehicle following the lead platoon vehicle, (ii) a second middle platoon vehicle following the first middle platoon vehicle and (iii) a third middle platoon vehicle following the second middle platoon vehicle, wherein, responsive to said platoon control, each said individual platoon vehicle control controls the respective platoon vehicle so that the last platoon vehicle, the third middle platoon vehicle and the second middle platoon vehicle enter the other traffic lane, whereby the speeds of the respective platoon vehicles are controlled to generate gaps between the last, third middle and second middle platoon vehicles that have entered the other traffic lane and to align the lead and first middle platoon vehicles that are still in the initial traffic lane with the gaps, and wherein, when the lead and first middle platoon vehicles that are still in the initial traffic lane are aligned with the gaps and the speeds of the platoon vehicles are the same, said individual platoon vehicle controls of the respective lead and first middle platoon vehicles in the initial traffic lane control those respective platoon vehicles to enter the other traffic lane at the gaps between the last, third middle and second middle platoon vehicles that have already entered the other traffic lane.

6. The platoon control system of claim 5, wherein, responsive to said platoon control, each said individual platoon vehicle control adjusts the speed of the respective platoon vehicle (i) to allow traffic in the other traffic lane ahead of the last platoon vehicle to pass the platoon vehicles and ii to align the platoon vehicles that are still in the initial traffic lane with respective gaps between the platoon vehicles that have moved into the other traffic lane.

7. The platoon control system of claim 1, wherein, responsive to said platoon control, each said individual platoon vehicle control controls the respective platoon vehicle to maneuver the platoon vehicles to the other traffic lane responsive to a determination of clearance in the other traffic lane as determined by a short range sensing system of each of the respective platoon vehicles.

8. The platoon control system of claim 1, wherein, responsive to determination of a vehicle or obstacle in the initial traffic lane ahead of the platoon of vehicles, said individual platoon vehicle control controls the respective platoon vehicle to maneuver the platoon vehicles to the other traffic lane.

9. The platoon control system of claim 8, wherein the determination of the vehicle or obstacle in the initial traffic lane ahead of the platoon of vehicles is responsive to at least one of (i) a long range sensing system of the lead platoon vehicle and (ii) a vehicle-to-vehicle communication system.

10. The platoon control system of claim 8, wherein the determination of the vehicle or obstacle in the initial traffic lane ahead of the platoon of vehicles is made by said platoon control.

11. The platoon control system of claim 1, wherein each said individual platoon vehicle control controls (i) an accelerator of the respective platoon vehicle, (ii) steering of the respective platoon vehicle, (iii) a brake system of the respective platoon vehicle and (iv) a turn signal indicator of the respective platoon vehicle.

12. A platoon control system for controlling a plurality of vehicles traveling together as a platoon, said platoon control system comprising:
a platoon control in communication with a plurality of individual platoon vehicle controls disposed at respective platoon vehicles of a platoon of vehicles;
wherein each individual platoon vehicle control of said plurality of individual platoon vehicle controls is associated with a respective platoon vehicle of the platoon of vehicles traveling along an initial traffic lane, and wherein the platoon of vehicles comprises a lead platoon vehicle, a last platoon vehicle and at least one middle platoon vehicle between the lead platoon vehicle and the last platoon vehicle;
wherein said platoon control is disposed at one of the platoon vehicles of the platoon of vehicles;
wherein at least one short range sensing system disposed at each platoon vehicle of the platoon of vehicles senses a region of another traffic lane immediately adjacent to the initial traffic lane to determine if another vehicle is present in the other traffic lane at or near the respective platoon vehicle;
wherein, responsive to said at least one short range sensing system of each platoon vehicle of the platoon of vehicles, said platoon control determines if there is clearance in the other traffic lane for all of the platoon vehicles of the platoon of vehicles to maneuver into the other traffic lane;
wherein, responsive to a determination by said platoon control that a vehicle or obstacle is in the initial traffic lane ahead of the platoon of vehicles, each said individual platoon vehicle control controls the respective platoon vehicle to maneuver the respective platoon vehicle from the initial traffic lane traveled by the platoon vehicles to the other traffic lane in a manner that limits or precludes other vehicles from interrupting the platoon of vehicles as they maneuver into the other traffic lane; and
wherein, responsive to said platoon control determining that there is clearance in the other traffic lane for all of the platoon vehicles of the platoon of vehicles to maneuver into the other traffic lane, each said individual platoon vehicle control controls the respective platoon vehicle so that the last platoon vehicle of the platoon of vehicles enters the other traffic lane first and then the middle platoon vehicles and the lead platoon vehicle enter the other traffic lane ahead of the last vehicle in a predetermined controlled manner.

13. The platoon control system of claim 12, wherein each said individual platoon vehicle control controls the respective platoon vehicle so that the platoon vehicles enter the other traffic lane in order from the last platoon vehicle to the lead platoon vehicle.

14. The platoon control system of claim 13, wherein each said individual platoon vehicle control controls the speed of the respective platoon vehicle to decelerate the platoon vehicles together to allow traffic in the other traffic lane that is ahead of the last platoon vehicle after the last platoon vehicle has changed lanes to pass the platoon vehicles.

15. The platoon control system of claim 12, wherein each said individual platoon vehicle control controls the respective platoon vehicle so that the platoon vehicles enter the other traffic lane in a different order than they were in the initial traffic lane.

16. The platoon control system of claim 15, wherein the at least one middle platoon vehicle comprises (i) a first middle platoon vehicle following the lead platoon vehicle, (ii) a second middle platoon vehicle following the first middle platoon vehicle and (iii) a third middle platoon vehicle following the second middle platoon vehicle, and wherein each said individual platoon vehicle control controls the respective platoon vehicle so that the last platoon vehicle, the third middle platoon vehicle and the second middle platoon vehicle enter the other traffic lane, whereby the speeds of the respective platoon vehicles are controlled to generate gaps between the last, third middle and second middle platoon vehicles that have entered the other traffic lane and to align the lead and first middle platoon vehicles that are still in the initial traffic lane with the gaps, and wherein, when the lead and first middle platoon vehicles that are still in the initial traffic lane are aligned with the gaps and the speeds of the platoon vehicles are the same, said individual platoon vehicle controls of the respective lead and first middle platoon vehicles in the initial traffic lane control those respective platoon vehicles to enter the other traffic lane at the gaps between the last, third middle and second middle platoon vehicles that have already entered the other traffic lane.

17. The platoon control system of claim 16, wherein each said individual platoon vehicle control adjusts the speed of the respective platoon vehicle (i) to allow traffic in the other traffic lane ahead of the last platoon vehicle to pass the platoon vehicles and ii to align the platoon vehicles that are still in the initial traffic lane with respective gaps between the platoon vehicles that have moved into the other traffic lane.

18. The platoon control system of claim 12, wherein the determination of the vehicle or obstacle in the initial lane ahead of the platoon of vehicles is made by said platoon control responsive to at least one of (i) a long range sensing system of the lead platoon vehicle and (ii) a vehicle-to-vehicle communication system.

19. A platoon control system for controlling a plurality of vehicles traveling together as a platoon, said platoon control system comprising:
  a platoon control in communication with a plurality of individual platoon vehicle controls disposed at respective platoon vehicles of a platoon of vehicles;
  wherein each individual platoon vehicle control of said plurality of individual platoon vehicle controls is associated with a respective platoon vehicle of the platoon of vehicles traveling along an initial traffic lane, and wherein the platoon of vehicles comprises a lead platoon vehicle, a last platoon vehicle and at least one middle platoon vehicle between the lead platoon vehicle and the last platoon vehicle;
  wherein a short range sensing system disposed at each platoon vehicle of the platoon of vehicles senses a region of another traffic lane immediately adjacent to the initial traffic lane to determine if another vehicle is present in the other traffic lane at or near the respective platoon vehicle;
  wherein, responsive to said short range sensing system of each platoon vehicle of the platoon of vehicles, said platoon control determines if there is clearance in the other traffic lane for all of the platoon vehicles of the platoon of vehicles to maneuver into the other traffic lane;
  wherein, responsive to said platoon control determining that there is clearance in the other traffic lane for all of the platoon vehicles of the platoon of vehicles to maneuver into the other traffic lane, each said individual platoon vehicle control controls the respective platoon vehicle to maneuver the platoon vehicles from the initial traffic lane traveled by the platoon vehicles to the other traffic lane in a manner that limits or precludes other vehicles from interrupting the platoon of vehicles as they maneuver into the other traffic lane;
  wherein, responsive to said platoon control, each said individual platoon vehicle control controls the respective platoon vehicle so that, responsive to a determination by said platoon control of clearance in the other traffic lane for all of the platoon vehicles of the platoon of vehicles to maneuver into the other traffic lane, the last platoon vehicle of the platoon of vehicles enters the other traffic lane first and then the middle platoon vehicles and the lead platoon vehicle enter the other traffic lane ahead of the last vehicle in a predetermined controlled manner;
  wherein the predetermined controlled manner comprises one of (i) maneuvering the platoon vehicles so that the platoon vehicles enter the other traffic lane in order from the last platoon vehicle to the lead platoon vehicle and (ii) maneuvering the platoon vehicles so that the platoon vehicles enter the other traffic lane in a different order than they were in the initial traffic lane; and
  wherein, responsive to said platoon control, each said individual platoon vehicle control controls at least (i) an accelerator of the respective platoon vehicle, (ii) steering of the respective platoon vehicle, (iii) a brake system of the respective platoon vehicle and (iv) a turn signal indicator of the respective platoon vehicle.

20. The platoon control system of claim 19, wherein each said individual platoon vehicle control controls the respective platoon vehicle to maneuver the platoon vehicles from the initial traffic lane to the other traffic lane responsive to a determination of a vehicle or obstacle in the initial traffic lane ahead of the platoon of vehicles, and wherein the determination of the vehicle or obstacle in the initial traffic lane ahead of the platoon of vehicles is made by said platoon control responsive to at least one of (i) a long range sensing system of the lead platoon vehicle and (ii) a vehicle-to-vehicle communication system.

* * * * *

UNITED STATES PATENT AND TRADEMARK OFFICE
CERTIFICATE OF CORRECTION

PATENT NO. : 10,115,314 B2
APPLICATION NO. : 15/203840
DATED : October 30, 2018
INVENTOR(S) : Ruediger K. Boegel Page 1 of 1

It is certified that error appears in the above-identified patent and that said Letters Patent is hereby corrected as shown below:

In the Specification

Column 7
Line 22, "and; or" should be --and/or--

In the Claims

Column 11
Line 10, Claim 6, "and ii to" should be --and (ii) to--

Column 13
Line 1, Claim 17, "and ii to" should be --and (ii) to--

Signed and Sealed this
Eleventh Day of December, 2018

Andrei Iancu
*Director of the United States Patent and Trademark Office*